United States Patent

Le Comte

[15] 3,676,784

[45] July 11, 1972

[54] APPARATUS FOR GENERATING AN ANALOGUE SAWTOOTH VOLTAGE, THE SLOPE OF WHICH CORRESPONDS WITH THE MEAN SLOPE OF A STEPPED SAWTOOTH VOLTAGE

[72] Inventor: Corstiaan Le Comte, Huizen, Netherlands

[73] Assignee: N. V. Hollandse Signaalapparaten, Hengelo, Netherlands

[22] Filed: Jan. 25, 1971

[21] Appl. No.: 109,213

[30] Foreign Application Priority Data

Jan. 29, 1970 Netherlands..........................7001235

[52] U.S. Cl...............................328/181, 307/227, 307/228, 328/186

[51] Int. Cl.........................................H03k 4/10, H03k 4/02

[58] Field of Search.................................307/228, 229, 227; 328/181–186

[56] References Cited

UNITED STATES PATENTS

| | | | |
|---|---|---|---|
| 2,958,828 | 11/1900 | Schreiber | 328/186 |
| 3,493,961 | 2/1970 | Hansen | 328/185 X |
| 3,571,617 | 3/1971 | Hainz | 307/228 |

FOREIGN PATENTS OR APPLICATIONS

| | | | |
|---|---|---|---|
| 1,223,877 | 9/1966 | Germany | 307/228 |

*Primary Examiner*—Stanley D. Miller, Jr.
*Attorney*—Frank R. Trifari

[57] ABSTRACT

A sawtooth generator provided with a device for generating a digital sawtooth function, said device being connected to a digital-to-analogue converter, also containing an integrator and an error voltage detector to convert differences occuring at discrete moments between the output voltage of the digital-to-analogue converter and the output voltage of the integrator to a control voltage varying in steps, which, fed to the integrator causes the output voltage of the integrator to form an approach of the function to be generated shaped as an angled line.

1 Claim, 8 Drawing Figures

Figure 1:
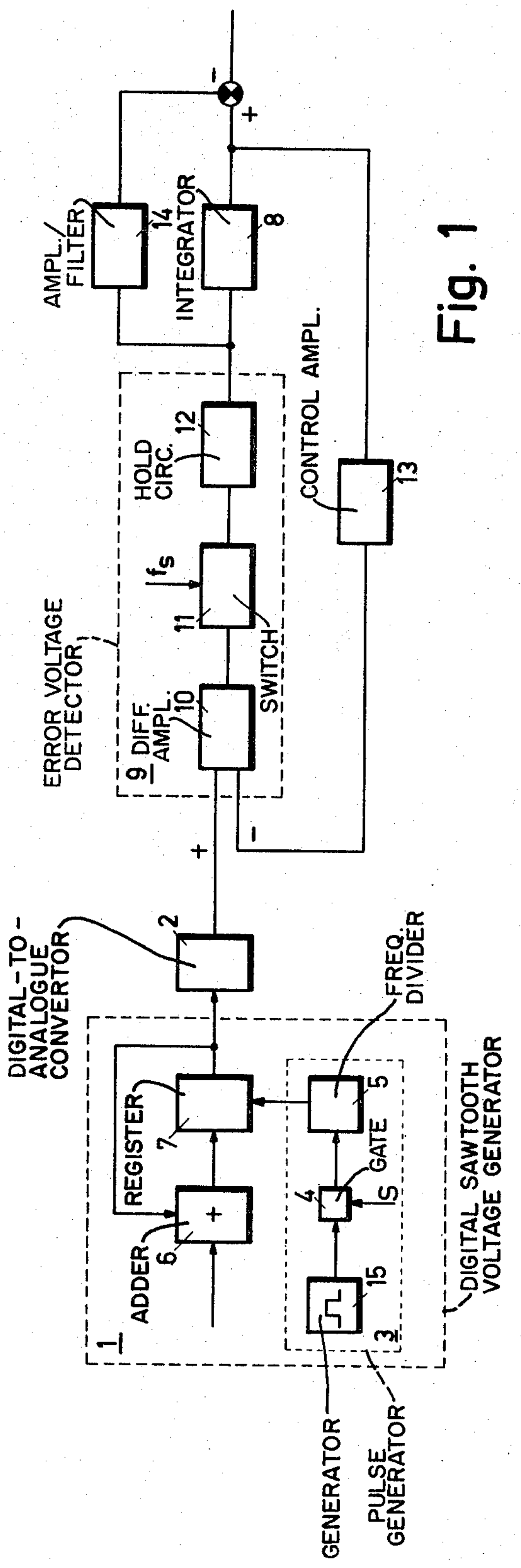

INVENTOR
CORSTIAAN LE COMTE
BY
AGENT

INVENTOR

CORSTIAAN LE COMTE

BY Frank R. Trifari

AGENT

APPARATUS FOR GENERATING AN ANALOGUE SAWTOOTH VOLTAGE, THE SLOPE OF WHICH CORRESPONDS WITH THE MEAN SLOPE OF A STEPPED SAWTOOTH VOLTAGE

The invention relates to an apparatus for generating an analogue sawtooth voltage, the slope of which corresponds with the mean slope of a stepped sawtooth voltage. The apparatus comprises a pulse generator an adder and a register connected to the output of said adder, the digital output signal of said register being fed to a first input of said adder, through a second input of which a unit step value is supplied and in which said digital output signal is raised by said unit step value. The obtained raised digital value is taken over by said register at the moment the pulse generator delivers a clock pulse. This raising process repeats with a frequency corresponding with that of the pulse generator in such a manner that at successive times said register contains a uniformly increased digital value, which is fed to a digital-to-analogue converter, said converter supplying a stepped sawtooth voltage.

Sawtooth generators are already known in many embodiments; a number of them, including generators of the above mentioned type, are used in digital PPI-systems. In such systems a counter required for the digital sawtooth generation functions as a range increment counter and is preferably designed as a scale of two divider. In the digital PPI-system as described in the French Pat. specification No. 1.519.414, the sawtooth generator further contains two binary multipliers which modulate the digital sawtooth voltage with the cosine or the sine, respectively, of an angular value offered. This angular value may be derived from the antenna position. The cartesian components of the deflection voltage obtained after said modulation are each represented by a digital sawtooth voltage. This causes a ripple in the displayed deflection beam. This ripple cannot be eliminated by using a passive, nor by using an active filter without causing an inadmissible delay of the output signal supplied by such a filter.

The object of the invention is to provide a sawtooth generator which fully obviates the above drawback.

For this purpose the sawtooth generator according to the invention contains an integrator and an error voltage detector by means of which differences occurring at discrete moments between said stepped sawtooth voltage and the output voltage of the integrator are converted to a control voltage varying in steps. The control voltage fed to said integrator, causes the slope of said integrator output voltage at said discrete moments to approach the mean slope of said stepped sawtooth voltage. These discrete moments occur at least when a minimum time has elapsed calculated from the moment that the output voltage of the digital-to-analogue converter is changed. The error voltage detector further comprises in succession, a differential amplifier to determine the error voltage from the output voltage supplied by the integrator and the voltage derived from the digital-to-analogue converter, a switch which is operated at a frequency corresponding to that of the pulse generator and a hold circuit, providing the integrator with the required control voltage. The apparatus finally comprises an amplifier/filter to which said control voltage is supplied and which control voltage forms a d.c. correction voltage to be added to the integrator output voltage.

The invention and its advantages are further explained with reference to the figures, of which:

FIG. 1 shows the block diagram of the sawtooth generator according to the invention; while FIGS. 2A, 2B and 3A–3E show a number of diagrams to explain the sawtooth generator according to FIG. 1.

In FIG. 1 the apparatus for generating an analogue sawtooth voltage, the slope of which corresponds with the mean slope of a stepped sawtooth voltage, comprises a digital sawtooth voltage generator 1 and a digital-to-analogue converter 2 connected to said generator 1. The digital sawtooth voltage generator 1 consists of a pulse generator 3, an adder 6 and a register 7. In the embodiment shown the pulse generator 3 consists of a clock pulse generator 15, a gate circuit 4 and a frequency divider 5. The digital output signal of the register 7 is fed to a first input of the adder 6. A unit step value is supplied through a second input of said adder. In the adder the digital output signal of the register is raised by said unit step value; the raised digital value so obtained is taken over by the register at the moment the pulse generator 3 delivers a clock pulse to said register. This raising process is repeated with a frequency corresponding with that of the pulse generator. Consequently, at successive times the register contains a uniformly increased digital value which is fed to the digital-to-analogue converter. The taking-over of the value raised stepwise in the adder by the register is controlled by the clock pulses supplied by the frequency divider 5 of the pulse generator. This frequency divider is provided with the required pulses by generator 15, namely via gate circuit 4, which gate circuit is enabled each time for the duration of a sawtooth generation by means of control signal S.

Figure 2B:
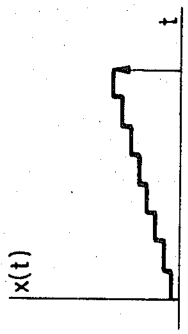
Figure 2A:
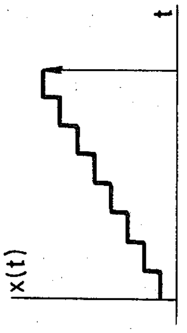

The digital sawtooth voltage supplied by register 7 is fed to the digital-to-analogue converter 2, whose output voltage $x(t)$ is shown in FIG. 2A. This output voltage can be represented by the following functional relation:

$$x(t)=\sum_{n=0}^{k} \epsilon(t-nT),$$

where $\epsilon(t-n\mathrm{T})$ represents the unit step function at time $t = n\mathrm{T}$ $(n=0, 1, 2, \ldots)$.

If the sawtooth generator, as hitherto described, is used in digital PPI-systems, the digital sawtooth voltage must be modulated with the cosine or the sine, respectively, of an angular value offered. This angular value may be derived from the position of a radar antenna. Said modulation takes place by modulating the digital signal to be fed to the adder with the cosine or sine of an angular value offered and by adding the digital value thus obtained to the digital sawtooth value already available in the register. The output signal obtained by this modulation from the digital-to-analogue converter is shown in FIG. 2B and satisfies the above functional relation with the exception of a multiplicative constant. The multiplication of a "unit step" by the sine or the cosine of an angular value offered does not change the consideration in principle.

In order to convert the digital sawtooth voltage to a voltage represented by an angled line, which very nearly approaches an "ideal" sawtooth voltage, the sawtooth generator according to the invention is provided with an integrator 8 and an error voltage detector 9, whereby the differences occurring at discrete moments between the output voltage of the digital-to-analogue converter 2 and the output voltage of the integrator 8, are converted by means of a detector 9 to a stepwise varying control voltage, which, supplied to the integrator, causes the output voltage of the integrator to form an approach of the function to be generated shaped as an angled line, whereby said discrete moments occur at least when a minimum time has elapsed, calculated from the moment the output voltage of the digital-to-analogue converter 2 is changed, and whereby said error voltage detector successively comprises: a differential amplifier 10 to determine the error voltage from the output voltage supplied by integrator 8 and the voltage derived from the digital-to-analogue converter, a switch 11, which is operated by a frequency corresponding to that of pulse generator 3 and a hold circuit 12, which provides integrator 8 with the required control voltage, which sawtooth generator finally comprises an amplifier and filter 14 by means of which a correction voltage which is to be added to the integrator output voltage is formed from the voltage supplied by hold circuit 12.

The embodiment shown in FIG. 1 also comprises control amplifier 13 via which the integrator output voltage is fed to the differential amplifier 10. The error voltage signal obtained from differential amplifier 10 is sampled by switch 11. This switch is open during a time of approximately 100 nsecs at a frequency $f_s$, which corresponds to the repetition frequency of the clock pulses supplied by frequency divider 5. In the embodiment concerned $f_s = 2/3$ MHz.

Figures 3A, 3B, 3C, 3D, 3E:
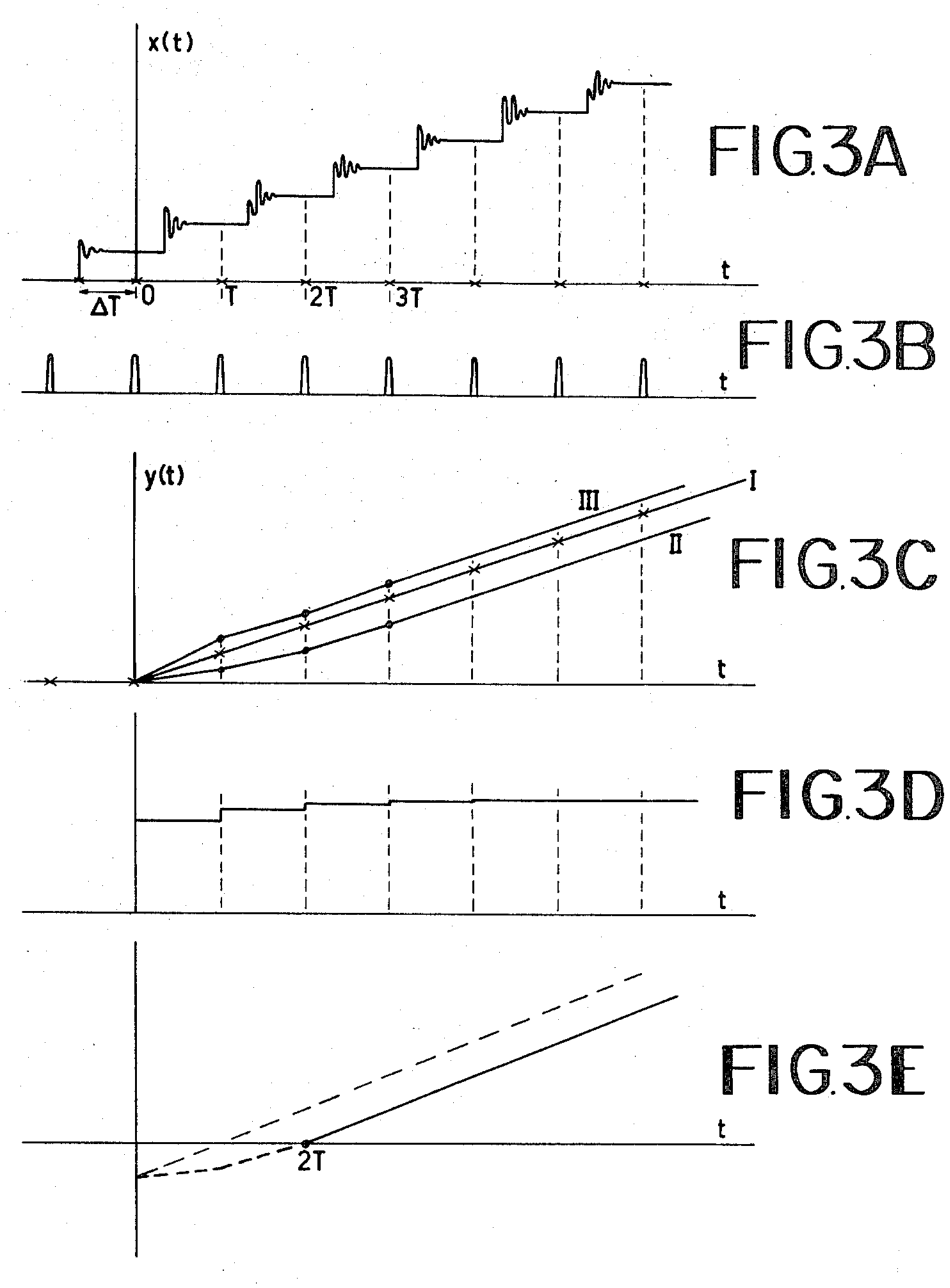

In general, the sample moments should at least occur after a minimum time has elapsed, calculated from the moment the output voltage of the digital-to-analogue converter is changed. FIG. 3B shows these sample moments for the embodiment in question. FIG. 3A shows the output voltage of the digital-to-analogue converter provided with the interferences inherent to it. These interferences occur each time when the output voltage of the digital-to-analogue converter is changed, i.e., is raised. After such a change some time should elapse during which the digital-to-analogue converter may return to the quiescent state. During this time the occurrence of sample moments is not desired: thus, a minimum time must pass, calculated from the moment the output voltage of the digital-to-analogue converter is changed (denoted in FIG. 3A by ΔT).

The magnitude of the error voltage at the sample moments is fixed during the subsequent sample intervals by hold circuit 12. The voltage supplied by this hold circuit, which may consequently vary steplike is an input signal for integrator 8 and causes the output voltage of this integrator to be varied in time corresponding to a voltage, represented by an angled line, which very nearly approaches an ideal sawtooth voltage. If the output voltage of the digital-to-analogue converter as depicted in FIG. 3A is represented by $$x(t)=\sum_{n=0}^{\infty} \epsilon(t-nT+\Delta T),$$

the voltage supplied by the integrator can be represented by the relation $$y(t)=A\cdot\sum_{n=0}^{\infty} (1-A\beta T)\ n\cdot(t-nT)\cdot\epsilon(t-nT),$$

where T is the reciprocal sample frequency, $\beta$ the amplification of control amplifier 13 and AT the forward gain. The loop gain is denoted by the product $A\beta T$. If $A\beta T$ is equal to 1, the integrator 8 supplies an output voltage which can be represented by the following relation $$y(t) = A.t.\epsilon(t).$$

Apparently, in this case an ideal sawtooth voltage is obtained from the beginning. In practice the loop gain $A\beta T$ will always deviate from the value 1. For the case that $A\beta T<1$, the output voltage of the integrator can be represented by a curve II in FIG. 3C; if on the other hand $A\beta T>1$, this voltage can be represented by the curve III in FIG. 3C. In both curves the slope approaches the value:

$$A\sum_{n=0}^{\infty} (1-A\beta T)^{n}=\frac{1}{\beta T}$$

(the condition for this convergency is: $A\beta T<2$). FIG. 3C shows the ideal sawtooth voltage represented by curve I, whose slope has the value $1/\beta T$. The following may serve to give an impression of the accuracy of which curves II or III must approach curve I: the deviation of curve II or III at time $t = 2T$ must be less than 0.1 percent of the value of the "ideal" sawtooth voltage at the time $t = 16T$. If the above accuracy requirement is to hold from the zero value of the sawtooth voltage to be generated, additional measures should be taken. For the case that $A\beta T<1$, and the output voltage of the integrator can thus be represented by curve II in FIG. 3C, the voltage supplied by hold circuit 12 can be represented by the curve shown in FIG. 3D. This voltage is fed to an amplifier filter 14. In order to be able to derive a constant voltage from said amplifier filter, the following frequency components should be removed from the signal supplied by hold circuit 12: the sample frequency (⅔ MHz) and the relatively strong higher harmonics of this frequency component.

The constant voltage derived from the amplifier filter is deducted form the output filter of the integrator. The result obtained is represented in FIG. 3E. This figure shows that from the time $t=0$ 2T a sawtooth voltage is obtained which meets the accuracy required, from the zero value. The same result is obtained by considering case $A\beta T>1$.

It will be clear that the circuit constituted by integrator 8, error voltage detector 9 and possibly control amplifier 13 cannot be applied only for sawtooth generation, but can be connected to a digital-to-analogue converter, supplying a random voltage varying in time and generated in digital form. For, the input voltage of the integrator is always (at the sample moments) so adjusted that the time variation of the output voltage follows steplike the generated function in digital form. Thus, the output voltage of the integrator forms an approach of a function to be generated shaped as an angled line.

What we claim is:

1. Apparatus for generating an analogue sawtooth voltage, the slope of which corresponds with the mean slope of a stepped sawtooth voltage, comprising a pulse generator, an adder and a register connected to the output of said adder, the digital output signal of said register being fed to a first input of said adder, through a second input of which a unit step value is supplied and in which said digital output signal is raised by said unit step value, the obtained raised digital value being taken over by said register at the moment the pulse generator delivers a clock pulse, said raising process repeating with a frequency corresponding with that of the pulse generator in such a manner that at successive times said register contains a uniformly increased digital value, which is fed to a digital-to-analogue converter, said converter supplying a stepped sawtooth voltage, wherein said apparatus further comprises an integrator and an error voltage detector means for converting differences occurring at discrete moments between said stepped sawtooth voltage and the output voltage of the integrator into a control voltage varying in steps, means for connecting the output of the converter to the integrator for causing the slope of said integrator output voltage at said discrete moments to approach the mean slope of said stepped sawtooth voltage, said discrete moments occurring at least when a minimum time has elapsed calculated from the moment that the output voltage of the digital-to-analogue converter is changed, said error voltage detector further comprising in succession: a differential amplifier means for determining the error voltage from the output voltage supplied by the integrator and the voltage derived from the digital-to-analogue converter, a sawtooth operated at a frequency corresponding to that of the pulse generator and a hold circuit, providing the integrator with the required control voltage, the apparatus finally comprising an amplifier/filter to which said control voltage is supplied and which control voltage forms a d.c. correction voltage to be added to the integrator output voltage.

* * * * *